Dec. 19, 1939.  J. L. G. MEYER ET AL  2,184,063
PROCESS OF PRESERVING EGGS AND APPARATUS FOR CARRYING OUT SAID PROCESS
Filed Aug. 1, 1936  2 Sheets-Sheet 1
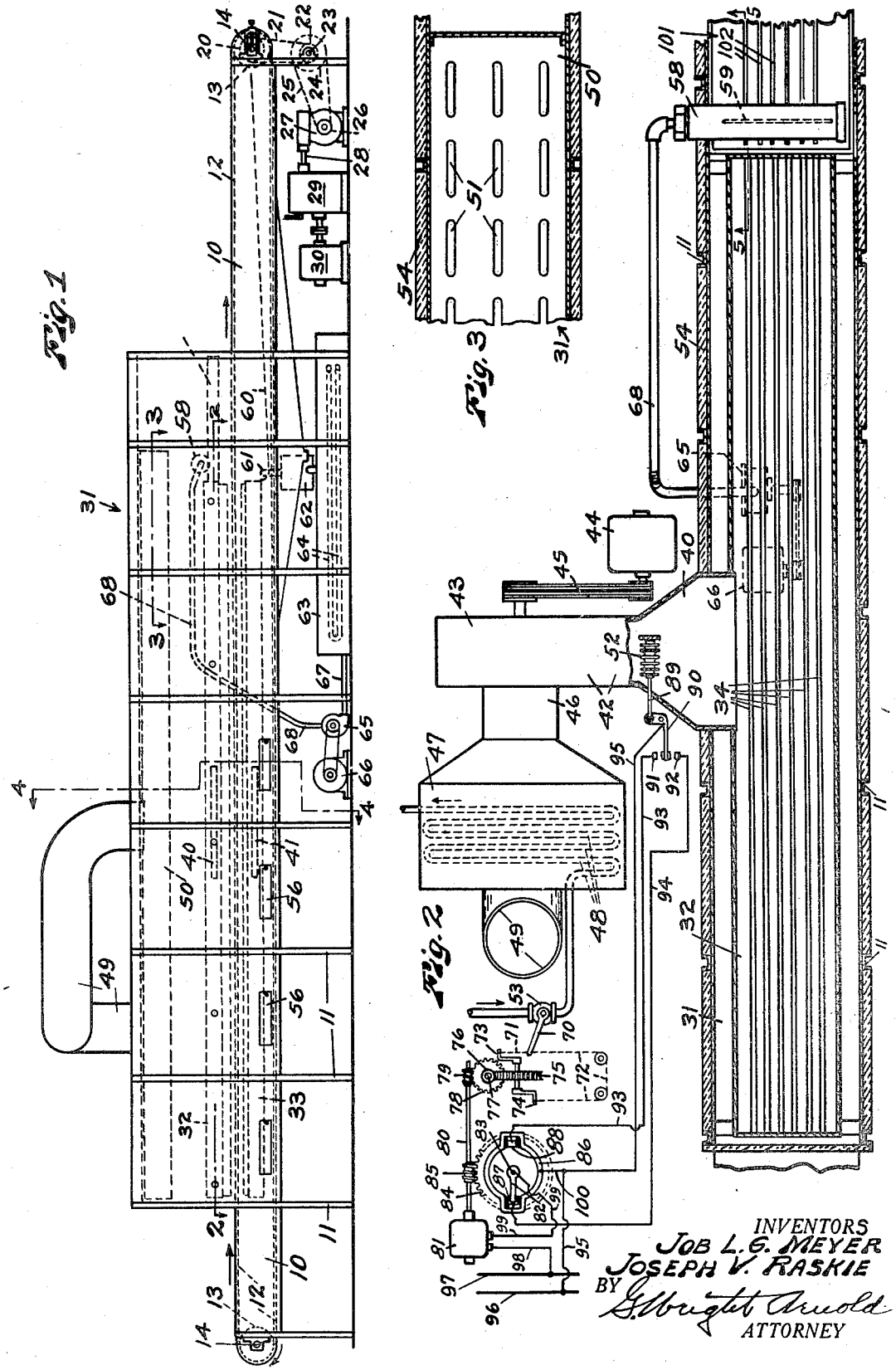
INVENTORS
JOB L. G. MEYER
JOSEPH V. RASKIE
BY
ATTORNEY

INVENTORS
JOB L. G. MEYER
BY JOSEPH V. RASKIE
ATTORNEY

Patented Dec. 19, 1939

2,184,063

UNITED STATES PATENT OFFICE 2,184,063

PROCESS OF PRESERVING EGGS AND APPARATUS FOR CARRYING OUT SAID PROCESS

Job L. G. Meyer and Joseph V. Raskie, Seattle, Wash., assignors to Washington Co-Operative Egg and Poultry Association, Seattle, Wash., a corporation of Washington Application August 1, 1936, Serial No. 93,850

10 Claims. (Cl. 99—241)

Our invention relates to a process of preserving eggs and apparatus for carrying out said process. More particularly, our invention relates to a process for oil treating eggs under conditions which bring about advantages not heretofore realized in this art.

It has been heretofore common practice to dip eggs in oil or to spray eggs with oil to aid in the preservation of the eggs. While many varieties of oil have been used, generally light mineral oil, such as that suggested by the United States Letters Patent to Henderson, Numbers 1,174,008 and 1,177,105 is satisfactory. In applying such oil, many processes have been tried, such as dipping or spraying with hot oil, dipping or spraying with cold oil, and dipping or spraying with oil directly after the egg has been laid, as is set forth in United States Letters Patent to W. H. Strickler, Patent No. 762,562, issued June 14, 1904.

Eggs so treated by the prior art practices have not been preserved for the desired periods as often required for shipping and storage, and the practical art has been seeking a process which will preserve eggs for longer periods.

The method of dipping cold eggs into or spraying the same with hot or cool oil has been found wanting because as a matter of fact the eggs, so treated, are not actually preserved for the desired periods. This failure to preserve the eggs in part may be explained by the fact that the eggs so treated do not contain a complete coating of oil on the inside of the egg shell.

As distinguished from such mode of operation, our process of heating the egg to a desired temperature, permits regulation of the amount of oil drawn through the egg shell and provides a complete coating of oil enveloping the membrane, which encloses the egg meats—white and yolk. This feature of a complete coating resulting from our process has been proven by providing a dye matter in the oil and by observing the coloring effects of the dye matter on the inside of the shell. Such complete coating is not found in the eggs treated according to the prior art practices and may explain the phenomenal keeping qualities of eggs treated in accordance with our invention.

The process of permitting an egg to roll into an oil bath immediately after laying and while the same still retains the animal heat from the hen, is also impractical. One objection to such a method of preserving eggs is that it is not practical to have an oil bath under each nest to receive the egg directly after it has been laid. Also the air in the hen house generally contains dust and bacteria, so a process requiring oil to be kept about a hen house is highly unsanitary, as it results in contamination of the oil. Such contaminated oil is obviously unsuited to be drawn through the egg shell. Again, as such an egg, which passes immediately upon laying into oil, cools, it produces a vacuum therein, thereby allowing more and more oil to enter or be drawn inside of the egg shell, which results in the egg taking in too much oil for a practical preserving process. When the temperature of eggs so treated is increased over that at which they have been kept, such eggs will sweat oil. Such increase in the temperatures of eggs are normally encountered especially during the summer in stores, stands and the like, where eggs are offered for sale, which results in a physical appearance of an egg exuding oil, which is obviously highly objectionable.

As distinguished from such mode of operation, our process permits control of the amount of oil drawn inside of the egg shell and provides a coating of oil which completely envelopes the membrane enclosing the egg meats—white and yolk. The control obtaining in our process permits uniform treatment of the eggs, prevents eggs taking in an excess of oil and exuding the same by sweating, and precludes the eggs taking in an insufficient amount of oil.

Respecting appearance of the eggs: Obviously it is desirable that the processing of the egg should not leave the egg with an appearance which is unlike the natural appearance of the egg. This natural appearance is dull, as opposed to shiny. If the egg is a white egg the natural appearance is a dull chalky white color. If the egg is brown, the natural color is a chalky or dull finished brown. Eggs processed according to present methods, which methods have hereinabove been set forth, or eggs processed according to the Strickler teaching, leave an oily glossy finish. Accordingly, the practice is to put the eggs through the extra operation of sanding off this glossy finish. The process embodying our invention avoids the necessity of having to sand off the egg as our process provides an egg with its natural dull appearance. At the same time, our process is characterized by the feature that the maximum amount of oil, which is drawn into the egg, is relatively small and is not readily detectible upon opening the egg.

Furthermore, it is to be remembered that the egg shell, immediately when the egg is laid, is somewhat soft and only attains its hardness after being exposed to the air for some little time. Also the egg when first laid has a secretion upon the egg shell which constitutes the bloom when dry. If an egg, immediately upon being laid, is exposed to the oil, as in Strickler, then this bloom substance, upon coming in contact with the oil, is for the most part dissipated, the loss of which leaves the egg with an oily glossy appearance. In other words, if the eggs are oil processed, as in Strickler, they give the appearance of an egg washed in warm or hot water, as distinguished from eggs processed in accordance with our invention, which do not give the appearance of such washed eggs.

One of the possible reasons why an egg treated according to the Strickler process absorbs too much oil may be because the egg shell pores, immediately upon the egg being laid, are too open, allowing too free the passage of the oil upon the shrinkage of the contents of the egg upon cooling.

In contrast, the processing of the egg according to our invention provides for the egg to be processed after the bloom has been dried upon the egg and after the air sack has been formed. The drying of the bloom secretion upon the egg gives the dull appearance and closes the pores of the egg. Accordingly, we have discovered that such an egg bloom, when exposed to the oil, seems to be substantially insoluble in the oil so that sufficient of the bloom remains upon the egg after the treatment which provides the egg with its natural dull chalky appearance. Our process would seem to open up the pores, or at least to enable such pores as are not closed by the bloom to absorb sufficient of the oil to provide the complete coating of oil for the membrane which envelops the egg meats.

Besides the objectionable appearance of eggs treated in accordance with the Strickler process, it has been found that such eggs do not keep well. This failure to keep well obtains regardless of whether or not the eggs are placed in cold storage. Referring particularly to the cold storage problem, the question of acid or alkaline condition of the eggs is important. In a freshly laid egg the average condition is that the egg white is slightly alkaline, while the egg yolk is slightly acid. With time the alkaline condition increases in both the egg white and the egg yolk. It has been found that with the increase of alkalinity, the carbon dioxide, which was present in the yolk of the freshly laid egg, gradually diffuses through the yolk into the egg white. The carbon dioxide in the white passes through the shell into the air. With the escape of carbon dioxide from the egg yolk and egg white and the increasing of the alkalinity therein, deterioration develops in the egg, which is evidenced as follows:

(1) Watery whites; (2) passage of water from the white to the yolk, producing a fluid condition of the yolk contents; (3) weakening of the yolk membrane, causing the yolk to flatten when the egg is broken, and if this weakening has progressed far enough, the yolk will break. Practice has shown that the concentration of carbon dioxide, which is necessary to maintain the desired acidity in the egg, or the desired alkalinity in the egg, varies with the temperature at which the eggs are stored. Thus the concentration of carbon dioxide in a freshly laid egg is not the concentration which is most practical for eggs which are to be kept in cold storage where the temperature of the eggs is just above the freezing temperature of eggs—in cold storage the aim is to keep the temperature approximately 31° F. It has been found in practical experience that fresh laid eggs, if oil processed too soon, do not keep their appearance well in cold storage, and that the quantity of carbon dioxide retained is too much for the best preservation of the eggs at cold storage temperatures. Also processing freshly laid eggs, which are still warm from animal heat, prevents the desired development of the air sack and brings about difficulties which will be hereinafter considered.

At the time that a hen lays its egg, there is little or no air sack. As the egg cools there is a contraction or a shrinkage of the contents of the egg which allows the formation of an air sack in the large end of the egg. The shrinking of the egg content permits a difference in pressure on the inside and outside so that the atmospheric pressure is sufficient to force air through the pores of the egg and develop what is known as the air sack. There is a natural bloom or organic coating when the egg is first laid that fills the pores of the egg shell and prevents the evaporation of the egg, so that the shrinkage is retarded after the first cooling period is concluded. However, after some time, or after the newly laid egg dries off, (two to four hours) this bloom or organic matter disappears and the shrinkage of the egg continues, largely through evaporation and with the consequent increase in the size of the air sack. The size of air sack is of great importance. The size of the air sack is one measuring feature by which the grade of the egg is determined, i. e., the larger the air sack the lower the grade of the egg. The size of air sack, presently held to be proper or best, is one-eighth of an inch (⅛ inch) deep from the top for a "class extra", as determined by the United States Government grading rules.

In addition to the bearing of the size of the air sack on the grade of the egg, many other features help to determine the grade of the egg: size; texture and tint of the egg shell and yolk; and miscellaneous factors which deal with defects which the eggs, as grass rot, blood spots, watery whites, etc. In the interest of economy only a portion of the supply of eggs will be processed and these should be the better grades of eggs— generally those free of the above defects. A considerable percentage of the eggs in unprocessed condition may be sold locally in unbroken condition, or such eggs may be broken and frozen for future use or may be sold in the broken condition for early use.

It is an object of this invention to process eggs after the original natural animal heat is removed and say, ordinarily not later than a period of ten days or so. It will be understood that said period varies with climatic conditions, as temperature, humidity, drafts, etc. This allows time for collection, grading and processing. Heretofore it has always been considered to be important to put the eggs under refrigeration as promptly after laying as possible. Subjecting an egg to heat is proceeding along the lines directly contrary to accepted views as to the best means of preserving the egg. However, contrary to such views applicants have discovered that it is advantageous to heat the eggs to a predetermined temperature and after so heating the eggs to subject them to an oil treatment, as by flowing oil over or spraying or immersing the eggs. If an egg is heated, it has been found that subsequent cooling produces a partial vacuum, tending to draw inside of the egg shell oil on the outside thereof.

Applicants have found that the size of the air sack which is found in the egg within said ten day period should be reduced about 25%. The size of the air sack within such ten day period generally will not develop to an objectionable degree. Applicants have discovered that the ten day period ordinarily provides for the proper carbon dioxide concentration. In heating the egg, of course, the amount of the heating of the egg is determined by the degree of temperature of, and the period of time during which the egg is exposed to the heating medium. In the event that heating of the egg is accomplished by exposure to circulated air, the temperature and rate of circulation of the air as well as the period of exposure must be considered. Applicants have found that the amount of oil taken into the egg can be very well determined by regulating the degree of heating of the egg. They have also discovered that it is not necessary to raise the temperature of the egg meat beyond seventy-five to one hundred degrees Fahrenheit (75° F. to 100° F.) to bring about the desired reduction of the volume of the air sack and to bring about the desired expulsion of air necessary to permit the proper absorption of oil upon cooling of the contents of the egg. Furthermore, applicants have found that it is positively desirable to retain a portion of the air within the egg for reasons which will appear hereinafter. The main function of the oil is to prevent evaporation during the period occurring between the time of treatment and consumption of the egg. This period may include time for shipment, storage, time kept in retail stores, and time kept on the shelves of the consumers. We have found that eggs, treated in accordance with our invention, will be preserved for a period a plurality of times longer than untreated eggs or eggs treated by any of the prior art processes presently commercially employed.

For example: We have made comparisons with three groups of eggs, as follows: group $a$ were eggs untreated; group $b$ were eggs treated according to present commercial methods, (i. e., cold eggs treated with either hot or cold oil); and group $c$ were eggs treated according to the process embodying our invention. The eggs were exposed to normal temperatures, i. e., 60 to 85° F.

The following results were noted where the important factors, such as temperature and humidity, were identical for all groups, as they were stored side by side in the same room: The untreated eggs would show a dropping in grade in two weeks time. Those of group $b$ showed a dropping in grade during the first month. In decided contrast with the above the eggs processed according to our invention did not show a dropping in grade until after a period of six months and were in proper condition for consumption at the end of nine months, whereas in group $b$ they were not in a condition fit for consumption at the end of four months.

In giving these results, the following is to be kept in mind: The eggs in all groups, so far as we could detect, were eggs of the first class. Of course, as a matter of fact they were different in many ways, which are not detectable until after the lapse of time. Some eggs, for example, are much heavier shelled than others, and some egg shells are more porous than others. Some have a structure inside, due to feeding of hens and the condition under which it was laid. The weather condition and the health and age of the hen are all important factors. Accordingly, it was the typical eggs of each group which were considered in giving the above results.

The following comparison of typical eggs will also be instructive in connection with eggs shipped in carload lots from the Pacific Coast to the Atlantic Coast. These eggs all graded "extras" at the time of processing. Part of them were processed according to present commercial prior art processes, and part according to the process of our invention. The part processed according to present commercial prior art processes, upon reaching New York and after being held in storage until they could be sold, were then graded and showed that only approximately fifty five percent of the eggs held up to the grade called "extras". Whereas, the eggs processed according to our invention were graded in New York, after the same period of time and after being subjected to similar conditions, and the eggs showed that approximately ninety percent of the eggs were still of the grade called "extras".

The eggs, after being processed in accordance with our invention, may be subjected to temperatures of ninety degrees Fahrenheit (90° F.), or more, without damage. Such temperatures tend to cause the contents of the egg to force out or expel a portion of the oil that has been introduced between the membrane, immediately surrounding the egg meats, and the egg shell. However, if there is an air sack present, then the same acts as a cushion for the oil and the oil is not forced out and the egg does not thereby sweat oil and become discolored or disfigured with the exuded oil. In this wise applicants have provided for the preserving of the eggs practically indefinitely, i. e., for any commercially required period, without injury to the appearance of the egg.

Applicants have discovered that the amount of oil drawn into the egg may be controlled by controlling the temperature and time elements in the process of heating the egg. This control of the amount of oil introduced into the egg is a very important feature of applicants' discovery. First, it makes possible to regulate the process and provide for the use of small amounts of oil where eggs are to be kept only short periods of time. Obviously eggs may be processed with small amounts of oil more economically if such treatment is satisfactory. However, where it is necessary to ship the eggs to a section of the country where they will be subjected to higher temperatures, and sold after a longer period of storage, then a larger quantity of oil is necessary. Again where it is necessary to ship the eggs to tropical or semi-tropical sections of the earth, where they must be exposed to relatively high atmospheric temperatures for a long period of time, extending into months, then it is necessary to conduct the processing under conditions which will supply the eggs with a much larger quantity of oil.

It has been suggested by Strickler, Patent No. 762,562 dated June 14, 1904, that if an egg, immediately upon being laid and while still retaining its animal heat, is rolled into a bath of oil, that such method prevents the development of all air sacks or of any substantial air sack and thereby results in preserving the egg. The trouble with an egg so treated is that when it is subjected to higher temperatures, such as to 90° F., which often obtains on the shelves of the retailer, it will sweat oil. This is due to the fact that there is no cushion or expansion chamber in the form of air in the air sack. As a result the egg so treated loses a certain amount of its oil on each occasion that it is subjected to such temperature. During the night such egg would normally be cooled and contracted and then the next day the egg would be heated again, due to the higher atmospheric temperature, and again sweating would occur and more oil would be lost from the processed egg. As a result, an egg which may have had an A grade in the first place, may be reduced to a C or D grade of egg and its period of preservation greatly shortened. Such sweating of the oil thus results promptly in a degrading of the egg and results in an unsightly appearance of the egg shell, which also is objectionable as it collects dust and imparts a dirty appearance to the egg. This is all due to the fact that such process of Strickler would not provide any such substantial air sack as is provided by applicants' process, which is functionally necessary to act as a cushion or expansion chamber for the expanded contents of the egg and prevent the expulsion of the oil by way of sweating.

Thus, it will be seen that applicants' process does not go contrary to nature in providing for the presence of said egg air sack which permits the necessary expansion and contraction of the egg contents, due to temperature changes. In a sense, the egg may be said to be breathing, due to changes in temperature, and applicants' process permits, in a degree, such natural action of the egg, while at the same time preventing the evaporation of the egg contents.

Nature provides for the shrinkage of the egg contents by evaporation in order to provide for the incubation of the egg. When the chick is developed within the egg, it picks its way through the membrane and breathes as its first air such air as is provided in the air sack. This shrinkage must continue in order to provide room for the chick to proceed to obtain such movement of the head to pick against the egg shell and make a line of fracture about the upper end of the egg, while its feet are pressing against the bottom part of the egg. Thus while nature provides for the natural shrinkage of the egg contents, applicants have found it necessary to overcome this natural shrinkage required by nature for incubation purposes, and while providing an air sack of a predetermined size, at the same time provide for the introduction of such quantity of oil as may be necessary to prevent evaporation and thereby stop shrinkage. Applicants have found that the period of keeping or preservation of the egg is a function of the quantity of the oil thus introduced. If the oil may be so introduced (for example by retaining a portion of the air) the egg may be kept commercially practically indefinitely, because the retention of the part of the air sack volume provides for a cushioning, which in turn prevents sweating of the egg and thereby loss of the oil.

Another important feature of our invention is that the egg shells are coated substantially completely on the inside with an oil coating. In view of the fact that such coating is on the inside of the shell, the outside of the shells may be cleaned of dirt by way of the usual processes, such as sanding, without affecting the oil coating. If the eggs are clean before processing according to our invention, then no sanding is necessary. However, it will be understood that some lots of eggs are processed while dirty, and these may be sanded as stated above.

In the accompanying drawings, throughout which like reference numerals indicate like parts, we have illustrated a form of mechanism which may be used in carrying out our process.

Figure 1 is a side elevation of this egg treating mechanism, certain parts being shown by dotted lines and other parts being shown somewhat diagrammatically;

Fig. 2 is a fragmentary sectional view, on a larger scale than Figure 1, taken substantially on broken line 2—2 of Figure 1, showing parts in plan and other parts diagrammatically;

Fig. 3 is a fragmentary sectional view substantially on broken line 3—3 of Figure 1;

Figure 5:
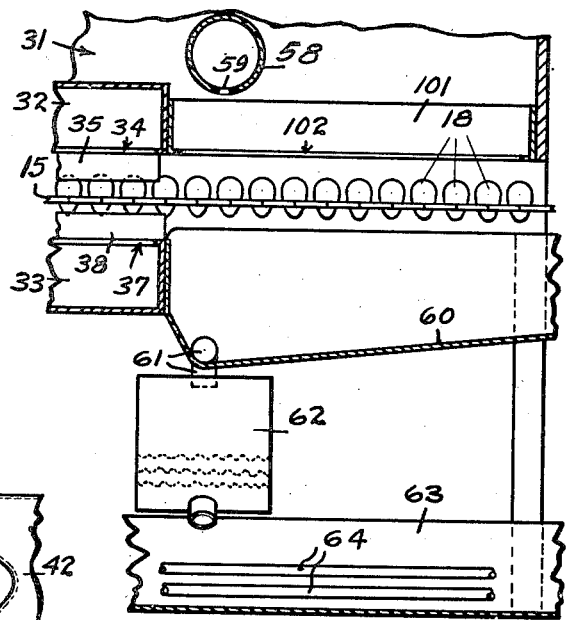
Fig. 5 is a fragmentary sectional view substantially on broken line 5—5 of Fig. 2.
Figure 8:
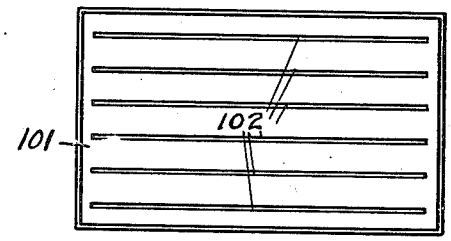
Fig. 8 is a detached plan view of a slotted oil pan.
Figure 6:
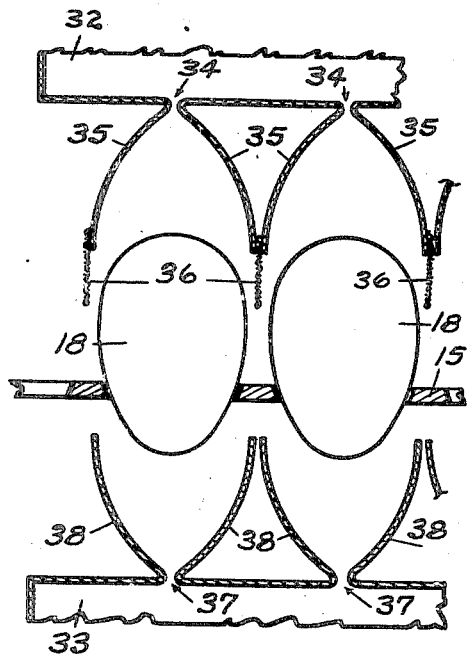
Fig. 6 is a fragmentary cross sectional view, on a larger scale than the other figures, illustrating more clearly the means for heating the eggs.
Figure 7:
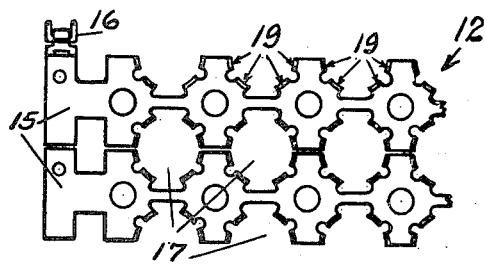
Fig. 7 is a fragmentary plan view of egg conveyor mechanism used in this egg treating apparatus.

The apparatus comprises a relatively long horizontal main frame 10 supported on upright members 11. An endless traveling egg conveyor 12 of slat belt type, shown by dotted lines in Figure 1, is operatively mounted on sprocket wheels 13 positioned at the two ends of the main frame 10. Transverse shafts 14 support the sprocket wheels 13. The egg conveyor is driven in the direction indicated by the arrows, the top lap of said conveyor belt moving from left to right as viewed in Figure 1. The egg conveyor is preferably of the type more fully disclosed in the prior patent to Job L. G. Meyer, No. 1,930,621, issued October 17, 1933. This conveyor comprises slats 15, Fig. 7, secured to link belts 16 and cooperating to form egg pockets 17 in which eggs 18 may be supported in the manner shown in Figs. 4, 5 and 6. The slats 15 are of relatively open construction, permitting free drainage of oil or other liquid therethrough and the free passage of air about the eggs. The egg pockets in the slats 15 each have a plurality of egg engaging elements 19 of relatively small size contacting the eggs 18 at a plurality of separate points and supporting the eggs in such a manner that heated air and oil can come in contact with the entire external surface of the egg.

It is an object of this invention to control the amount of oil taken in by the eggs. This may be done by regulating the amount of heating of the eggs. One manner of controlling this heating is by regulating the speed of travel of the eggs through the machine. This may be accomplished by providing variable speed driving means for the egg conveyor. Such means is preferably connected with the shaft 14 at the discharge end of the machine. This driving means is shown somewhat diagrammatically in Figure 1. It comprises a sprocket wheel 20 on the shaft 14 connected by a link belt 21 with a sprocket wheel 22 on a shaft 23. Another sprocket wheel 24 on the shaft 23 is connected by a link belt 25 and a sprocket wheel 26 with a speed reduction gear means 27. The speed reduction gear means 27 is connected by a shaft 28 with a variable speed transmission 29 which is connected with a motor 30. This provides driving means by which the speed of the egg conveyor may be varied to vary the length of time that the eggs are subjected to a predetermined heat. In the event that eggs having a temperature of about 50° F. are subjected to circulated heated air of approximately one hundred eighty degrees Fahrenheit (180° F.), we have found that the conveyor speed should be regulated so that the eggs will be subject to such heated air for a period of approximately three minutes. It has been found that the average temperature of the egg meat is raised to about seventy-five to one hundred degrees Fahrenheit (75 to 100° F.) by such exposure to circulated heated air.

An egg treating compartment, designated generally by 31, is provided intermediate the length of the egg conveyor. It has been found satisfactory in practice to make this egg treating compartment 31 about twenty feet long and to allow the egg conveyor to extend beyond said compartment about three feet at the intake or loading end and about seven feet at the discharge end, making the entire unit, as shown in Figure 1, about thirty feet long. The egg conveyor 12 extends through this egg treating compartment.

Figure 4:
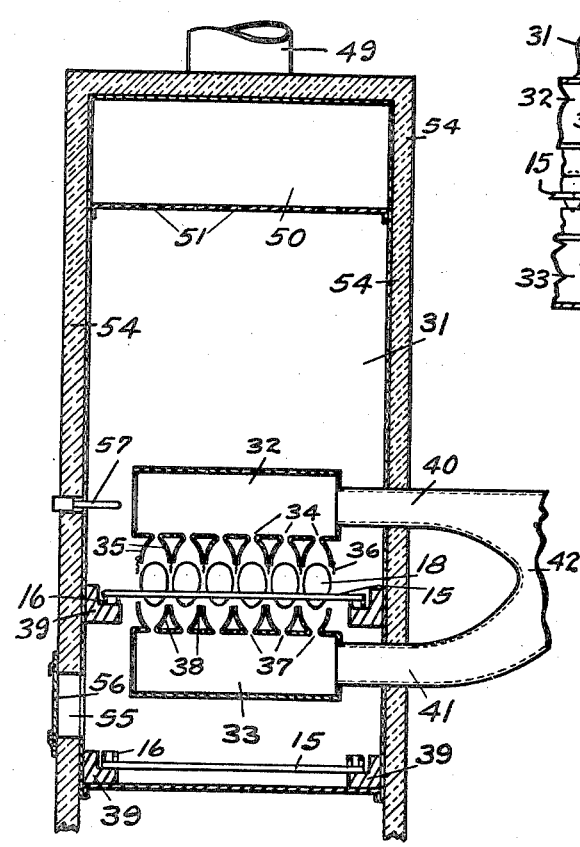
Fig. 4 is a sectional view, on a larger scale than Figure 1, taken substantially on broken line 4—4 of Figure 1, parts being broken away.

The egg treating compartment 31 may be rectangular in cross section, as shown in Fig. 4, and is closed on all sides except that sufficient openings are left at the ends for the passage, into and out of said compartment 31, of the egg conveyor and eggs carried thereby.

Two conduits 32 and 33 for heated air extend lengthwise within the egg treating compartment 31, one above another in substantially parallel spaced apart relation. These conduits 32 and 33 are preferably spaced from the sides of the egg treating compartment 31 to provide for a free circulation of heated air around the same. The bottom of the upper conduit 32 is provided with a plurality of longitudinally extending slots 34 through which heated air may be directed downwardly. These slots 34 are preferably wider adjacent the two ends of the conduit 32 and taper to a narrower width at a location mid-way between the two ends, as shown in Fig. 2. This tapering of the air discharge slots 34 provides for a substantially even discharge of heated air throughout the length of the slots where the supply of heated air is delivered into the conduit 32 mid-way between the two ends of said conduit, as hereinafter described. A plurality of air directing troughs 35 of bell shaped cross section project downwardly from the bottom of the upper conduit 32 and extend throughout the length of said conduit for the purpose of directing heated air onto eggs 18 which travel longitudinally under said troughs. One of the slots 34 opens into each trough 35. Preferably strips 36 of flexible material are secured to each edge of each trough 35 and extend downwardly over the eggs for the purpose of confining the heated air more closely to the eggs.

The lower conduit 33 for heated air has a plurality of slots 37 in its top wall which deliver heated air into a plurality of longitudinally extending upwardly directed troughs 38. The slots 37 and troughs 38 of the lower conduit 33 are substantially identical with the slots 34 and troughs 35 of the upper conduit 32. The slots 37 are tapered in the same manner as the slots 34.

The upper lap of the egg conveyor 12 travels between the two sets of troughs 35 and 38 and the eggs 18 are carried through the egg treating chamber with their axes substantially vertical and with one end of each egg positioned in an upper trough 35 and the other end positioned in a lower trough 38. The eggs are thus evenly subjected to the action of the heated air issuing from the slots 34 and 37.

The lower or return lap of the egg conveyor 12 is positioned below the lower heated air conduit 33. Preferably the egg conveyor 12 is supported on track members 39 which extend lengthwise within the egg treating compartment 31.

Heated air is supplied through a forked air conduit member having one branch 40 connected with the upper conduit 32 and another branch 41 connected with the lower conduit 33. The point of connection of the heated air supply means 40 and 41 with the conduit 32 and 33, respectively, is substantially midway between the two ends of the conduits 32 and 33. This provides a greater air pressure at the location where the heated air is supplied to the two conduits and a decreasing air pressure toward the ends of the conduits. To compensate for this difference in pressure and insure an even delivery of heated air throughout the length of the slots 34 and 37 we make said slots narrower at the medial portion and wider toward the ends of the conduits 32 and 33, as illustrated in Fig. 2 and hereinbefore explained. The two branches 40 and 41 are connected by conduit means 42 with a blower 43 which is driven by a motor 44 connected therewith by belt means 45. The blower 43 is connected by conduit means 46 with an air heating compartment 47. Any suitable air heating means, as a heating coil 48, is provided in the air heating compartment 47. A pipe 49 connects the air heating compartment 47 with an air draw off chamber 50 in the upper portion of the egg treating compartment 31. The bottom of the air draw off compartment 31 is provided with a plurality of openings 51, see Fig. 3, through which air may be drawn from the egg treating compartment 31. The openings 51 are distributed in such a manner as to provide for an even draw off of the air throughout the length of the egg treating compartment 31. With this air supply means the air will be re-circulated, thus conserving heat and heated air will be continuously supplied to the air conduits 32 and 33.

Preferably a thermostat means 52 is provided in connection with the hot air conduits 40—41—42. This thermostat 52 is responsive to the temperature of air which is being supplied to the egg treating compartment 31 and preferably controls the opening and closing of a valve 53 in the pipe 48 which supplies heating fluid to the heating compartment 47. One valve opening and closing means which may be connected with the valve 53 is diagrammatically shown in Fig. 2. This means comprises a lever 70 on valve 53 connected by two flexible connectors 71 and 72 with two crank members 73 and 74, respectively, which are secured to a worm wheel 75. The worm wheel 75 is driven by a worm 76 on a shaft 77. The shaft 77 has a worm wheel 78 engaged by a worm 79 on the shaft 80 of a motor 81. The motor 81 is provided with circuit control means for breaking the electrical circuit to said motor after a predetermined period of operation of said motor. In the present instance this circuit breaking means is adapted to break the circuit to the motor after said motor has made a sufficient number of revolutions to turn the worm wheel 75 and cranks 73 and 74 through an angle of approximatly 180° and thus reverse the position of the valve 53. This circuit control means comprises a contact arm 82 secured to a shaft 83 which is driven from the motor shaft 80 by a worm wheel 84 and worm 85. The contact arm 82 is movable in a circular path over a fixed arcuate contact member 86. Two contact elements 87 and 88 are provided at diametrically opposite points in the contact member 86. The contact elements 87 and 88 are positioned in the path of the contact arm 82, and are insulated from the contact member 86. When the contact arm passes onto one of the contact elements 87 or 88 it breaks contact with the contact member 86. The thermostat 52 is connected by a link 89 with a pivotally mounted bell crank shaped contact arm 90. The contact arm 90 is adapted to be moved by the thermostat 52 into electrical contact with either of two contact members 91 or 92. Contact member 91 is connected by conductor 93 with contact element 88. Contact member 92 is connected by conductor 94 with contact element 87. Contact arm 90 is connected by conductor 95 with one wire 96 of a circuit leading to a source of supply of electric current. Wire 96 is also connected by conductors 95 and 100 with arcuate contact member 86. The other wire 97 of the source of supply circuit is connected by a conductor 98 with the motor 81 and said motor 81 is connected by a conductor 99 with the contact arm 82.

It will be noted that the arcuate contact member 86 is connected with one conductor 96 of the source of supply circuit and that the contact arm 82 is connected through motor 81 with the other conductor 97 of the source of supply circuit, thus providing means for closing the circuit through motor 81 whenever the contact arm 82 makes contact with the contact member 86. It follows that if contact arm 82 is in electrical contact with arcuate contact member 86 the motor will continue to run until contact arm 82 breaks contact with member 86 by moving onto contact 87 or contact 88.

In Fig. 2 contact arm 82 is in contact with contact member 87 and thermostat controlled contact arm 90 is in a neutral or open circuit position. For these positions valve 53 will normally be open. If an increase in the temperature of thermostat 52 moves contact arm 90 into engagement with contact member 92 a circuit will be closed from conductor 96, along conductor 95, arm 90, contact 92, conductor 94, contact 87, arm 82, conductor 99, motor 81 and conductor 98 to wire 97. This starts the motor 81, moves arm 82 off of contact 87 onto contact member 86 and causes the motor 81 to continue to run until contact arm 82 moves onto contact 88 which is connected in a circuit that is open at the location of contact 91. By the time contact arm 82 reaches contact 88 the valve 53 will have been moved to the opposite or closed position. As the air around thermostat 52 becomes cooler contact arm 90 will be moved away from contact 92 but no further energizing of motor 81 will take place until contact arm 90 engages contact member 91 closing a circuit from source of supply conductor 96, along and through conductor 95, contact arm 90, contact 91, conductor 93, contact 88, contact arm 82, conductor 99, motor 81 and conductor 98 to source of supply conductor 97. This will supply energy to the motor 81 until the contact arm 82 moves from contact 88 around to contact 87, whereupon the circuit will again be opened and remain open until the circuit through contact 92 is again closed by a predetermined increase of temperature of thermostat 52. The gear ratio of the motor control speed reduction means formed by worm 85 and worm wheel 84 is the same as the gear ratio of the valve control speed reduction means formed by worm 79, worm wheel 78, worm 76 and worm wheel 75, and the position of the valve 53 will be reversed during movement of the contact arm 82 through substantially 180°. This provides means controlled by thermostat 52 for closing valve 53 when air in conduits 41—42—43 reaches a predetermined maximum temperature and opening said valve 53 when said air cools down to a predetermined minimum temperature.

The walls of the egg treating chamber 31 are preferably covered with heat insulating material 54 to conserve heat. A plurality of openings 55 having readily opened closure means 56 are provided in one side of the egg treating compartment allowing access to the interior of said egg treating compartment. Preferably thermometers 57 are provided at intervals throughout the length of the egg treating chamber to permit temperature readings at different locations.

An oil discharge pipe 58 having a longitudinal slot 59 in the bottom portion thereof extends horizontally across the egg treating chamber above the upper lap of the egg conveyor and between the end of the upper hot air conduit and the adjacent end wall of the egg treating chamber. This oil discharge pipe is adapted to discharge oil into an oil pan 101, (Figs. 1, 2, 5 and 8), which has slots 102 in the bottom thereof. The slots 102 are respectively positioned above the rows of eggs 18 and are adapted to discharge thin sheets of oil downwardly over the eggs just after the eggs emerge from between the heating conduits 32—33 and during the time the eggs are traversing the length of the pan. This oil flows downwardly over the eggs completely enveloping each egg with oil and leaving a film of oil on each egg. The surplus oil which does not adhere to the eggs is caught in a pan 60 from which it flows through a conduit 61 into an oil strainer 62. From the oil strainer 62 the oil discharges into an oil cooling tank 63. Cooling coil means 64 is preferably provided in the oil cooling tank 63. The temperature of the oil is preferably maintained at approximately sixty degrees Fahrenheit in this oil cooling tank. It has been found satisfactory to cool the oil by connecting the cooling coil means 64 with cold water service pipes, and allowing cold water at the temperature ordinarily found in these service pipes to circulate through the cooling coil means. An oil pump 65, driven by a motor 66, is connected by one pipe 67 with the tank 63 and by another pipe 68 with the oil discharge pipe 58. This provides for a continuous circulation of oil from tank 63 through pipe 67, pump 65, pipe 68, pipe 58, over the eggs 18, into the pan 60, through conduit 61, through strainer 62, and back into the cooling tank 63.

In the operation of this apparatus the three motors 30, 44 and 66 are energized to drive the egg conveyor, supply heated air to the conduits 32 and 33, and circulate oil respectively. Eggs to be treated are placed on the intake end of the egg conveyor, which is shown at the left in Figure 1, and are carried through the egg treating compartment with their end portions positioned respectively in the upper troughs 35 and lower troughs 38. Preferably the larger ends of the eggs are positioned upwardly to permit the oil to directly contact the larger ends in which the air pockets are formed.

The eggs are heated during their travel through the egg treating compartment and are completely covered with oil as they pass outwardly under the oil discharge pan 101. After passing through the bath of oil the excess oil is allowed to drain off of the eggs as the eggs proceed toward the discharge end of the machine. It will be noted from Figure 1 that the inclined bottom of the oil pan 60 extends substantially to the discharge end of the machine so that all oil which drains off of the eggs will flow back to the oil strainer 62. Before the eggs reach the location where the conveyor passes around the sprocket wheels 13 said eggs are lifted off of the conveyor by operators positioned near the discharge end of the machine.

By varying the speed of the egg conveyor by means of the variable speed power transmission 29 it is possible to vary the length of time during which the eggs will remain in the egg treating chamber and be subjected to heat. This provides one means of varying the temperature of the eggs at the time they are subjected to the oil bath and makes it possible to regulate the amount of oil taken in by the eggs. In thus setting forth one way of controlling the temperature of the eggs and the consequent control of the amount of oil taken into the eggs, we have set the same forth as an example and we are not to be limited to any such specific manner of controlling the heat and consequent control of the oil.

Thus our invention preferably contemplates a heated chamber of approximately one hundred eighty degrees Fahrenheit (180° F.), which has means for circulating heated air through which the eggs may be passed to heat the egg meats to a predetermined temperature, such as seventy-five to one hundred degrees Fahrenheit (75–100° F.). This heated air is preferably caused to impinge upon the eggs while the eggs are maintained in an upright position with the current of air directed upon the respective ends of the egg. One current of air is directed downwardly upon one end of the egg and the other current is directly upwardly upon the other end of the egg. After the egg is thus heated to the said desired temperature, the egg is removed from the heating means and is preferably directly bathed with relatively cool oil. As a means to completely envelop the egg in a current of air, we have illustrated a concave reflector covering the upper part of the egg and means in the nature of a piece of flexible material carried by the rim so that air is maintained against the sides of the eggs. Means are provided to maintain the oil at a temperature below that of the heated egg and preferably at a temperature less than the atmospheric temperature at which the eggs are being treated, i. e., if the atmospheric temperature is about seventy degrees F., then the temperature for the oil may be about sixty degrees F.

As illustrative of a means for cooling the oil we have shown coils directly in the bath of oil and which coils contain a circulating cooling fluid.

After the eggs are subjected to the cold oil treatment from outlet 58, the eggs are immediately packed in cases containing thirty dozen. These eggs are not entirely cold throughout when they are thus packed. Particularly the central portion is still warm and this heat is gradually dissipated until the egg becomes cold. The egg only becomes cold very gradually because the large number of eggs packed in the container tend more or less to retard the cooling operation. As the egg gradually cools and the contents thereof shrink it gradually draws in any oil which may remain on the egg shell surface. In this wise the gradual shrinking of the egg provides an assurance that any oil that may remain upon the surface of the egg shell will be drawn into the interior of the egg and the natural dull chalky egg appearance imparted to the egg shell. This slow cooling of the egg is an important feature in removing the final portions of the oil which might remain on the surface of the egg shell. If the egg was cooled suddenly we have discovered that oil may remain on the surface of the shell.

While the machine to carry out our process may obviously be of a simple character or may be more complex, an operative form of the same has been herein illustrated and described.

We have thus proceeded directly against the commonly practiced method of preserving eggs by heating the eggs to a predetermined temperature and thereby reduce the size of the air sack to a predetermined size and have then subjected the egg to processing by a relatively cool oil medium.

Obviously, changes may be made in the forms, dimensions and arrangement of the parts of our invention, without departing from the principle thereof, the above setting forth only preferred forms of embodiment.

We claim:

1. In apparatus of the class described, traveling egg conveyor means to support a row of eggs in upright position, hot air delivery means having a slot positioned in alignment with said rows of eggs to direct heated air onto the ends of said eggs and oil supply means positioned to deliver oil onto the eggs on the conveyor after said eggs have passed said hot air delivery means.

2. In apparatus of the class described, traveling egg conveyor means to support a row of eggs with their longitudinal axes substantially upright, hot air delivery means having a slot positioned in alignment with said row of eggs to direct heated air onto an end portion of said eggs, trough like air directing means communicating with said slot and extending toward said eggs to direct the heated air over said eggs and oil supply means positioned to deliver oil onto the eggs on the conveyor after said eggs have passed said hot air delivery means.

3. In apparatus of the class described, traveling egg conveyor means to convey eggs, egg heating means positioned to heat eggs carried on said conveyor, and an oil container positioned above said conveyor beyond said egg heating means having an oil discharge slot positioned to discharge a sheet of oil at a temperature less than the then temperature of said eggs downwardly over the heated eggs on said conveyor.

4. In apparatus of the class described, traveling egg conveyor means to convey eggs, egg heating means positioned to heat eggs carried on said conveyor, an oil container positioned crosswise above said conveyor beyond said egg heating means having an oil discharge slot positioned to discharge a sheet of oil downwardly over the heated eggs on said conveyor, oil collection means below said conveyor, oil circulating means to maintain a continuous circulation of the oil, and oil cooling means to cool the circulating oil.

5. In apparatus of the class described, housing means forming an egg treating compartment, an egg conveyor movable through said egg treating compartment, two heated air conduits positioned respectively above and below said egg conveyor, said air conduits having longitudinal slots directed toward said endless traveling egg conveyor, longitudinally extending opposed troughs on the slotted sides of and in communication with said heated air conduits extending toward said egg conveyor, providing air directing means directing air onto the eggs on said conveyor, heated air supply means connected with said heated air conduits, and oil supply means positioned to deliver oil at a temperature less than the then temperature of said eggs onto the eggs on said conveyor after they have passed between said heated air conduits.

6. In apparatus of the class described, housing means forming an egg treating compartment, an endless traveling egg conveyor movable through said egg treating compartment and extending beyond the end portions thereof, two heated air conduits positioned respectively above and below the top lap of said endless traveling egg conveyor, said air conduits having longitudinal slots directed toward said top lap of said endless traveling egg conveyor, longitudinally extending trough means on the slotted sides of and in communication with said air conduits extending toward said top lap of said endless traveling egg conveyor providing air directing means in which the upper and lower portions of eggs supported on the upper lap of said endless traveling egg conveyor are positioned as they move from one end to the other of said heated air conduits, heated air delivery means connected with said heated air conduits, and oil discharge means positioned to deliver oil onto the eggs on said conveyor after they emerge from between said heated air conduits.

7. In apparatus of the class described, housing means forming an egg treating compartment, an endless traveling egg conveyor movable through said egg treating compartment and extending beyond the end portions thereof, two heated air conduits in said egg treating compartment in spaced relation from the side walls thereof and positioned respectively above and below the top lap of said endless traveling egg conveyor, said air conduits having longitudinal slots directed toward said top lap of said endless traveling egg conveyor, longitudinally extending trough means on the slotted sides of and in communication with said air conduits extending toward the top lap of said egg conveyor providing air directing means in which the upper and lower portions of eggs on the upper lap of said conveyor are positioned as they move from one end to the other of said heated air conduits, an air draw off compartment provided in the upper portion of said egg treating compartment having openings communicating with said egg treating compartment, air circulating means communicatively connected with said two heated air conduits and with said air draw off compartment to draw air from said draw off compartment and supply air to said heated air conduits, air heating means operatively connected with said air circulating means, and oil supply means to deliver oil onto the eggs on said conveyor after they have passed between said heated air conduits.

8. In the process of treating eggs, the step of aging an egg to reduce the carbon dioxide concentration and to form an air sack therein; the step of heating such an egg until the egg meat attains a temperature of substantialy 75 to 100° F., whereby the contents of the egg will be expanded a predetermined amount; and the step of subjecting such an egg while so heated to oil cooler than the then temperature of said egg, whereby a vacuum of predetermined value will be created in the egg and a predetermined quantity of oil may be drawn inwardly through the pores of the egg shell.

9. In the process of treating eggs, the step of aging an egg to reduce the carbon dioxide concentration and to form an air sack therein; the step of heating such an egg with a blast of relatively hot air to reduce the size of the air sack and open the pores in the egg shell; the step of subjecting such an egg while so heated to oil cooler than the then temperature of said egg; and the step of removing the egg from the oil while the egg is still relatively warm to permit the egg to draw in oil remaining on the surface of the egg.

10. In the process of treating eggs, the step of aging eggs to reduce the carbon dioxide concentration and to form an air sack in each egg; the step of heating such eggs with a blast of hot air to reduce the size of the air sacks and to open the pores in the egg shells; the step of subjecting such eggs while so heated to oil cooler than the then temperature of said eggs; the step of removing the eggs from the oil while the eggs are still relatively warm; and the step of storing the eggs in relatively compact condition while the eggs are still relatively warm to permit the eggs to cool slowly and to slowly draw in the oil remaining on the surfaces of the eggs.

JOB L. G. MEYER.
JOSEPH V. RASKIE.